United States Patent
Ragsdale et al.

(10) Patent No.: US 10,166,413 B1
(45) Date of Patent: Jan. 1, 2019

(54) CONTROLLED DESCENT SAFETY SYSTEMS AND METHODS

(71) Applicant: BAILOUT SYSTEMS, LLC, Cincinnati, OH (US)

(72) Inventors: Michael A. Ragsdale, Cincinnati, OH (US); Troy S. Owens, Mt. Washington, OH (US); Patrick Thomas Henke, Hamilton, OH (US)

(73) Assignee: BAILOUT SYSTEMS, LLC, Cincinnati, OH (US)

( * ) Notice: Subject to any disclaimer, the term of this patent is extended or adjusted under 35 U.S.C. 154(b) by 0 days.

(21) Appl. No.: 15/209,469

(22) Filed: Jul. 13, 2016

Related U.S. Application Data

(60) Provisional application No. 62/191,665, filed on Jul. 13, 2016.

(51) Int. Cl.
*A62B 1/06* (2006.01)
*A62B 35/00* (2006.01)
*F16D 63/00* (2006.01)

(52) U.S. Cl.
CPC ............ *A62B 1/06* (2013.01); *A62B 35/0043* (2013.01); *F16D 63/002* (2013.01)

(58) Field of Classification Search
CPC ......... A62B 1/06; A62B 1/08; A62B 35/0043; A62B 35/0037; A62B 35/005; A62B 35/0056; F16D 63/002; F16D 2121/20; F16D 2121/18; F16F 15/03; F16F 15/035; H02K 49/04
See application file for complete search history.

(56) References Cited

U.S. PATENT DOCUMENTS

| | | | | |
|---|---|---|---|---|
| 3,713,521 A | * | 1/1973 | Moritake | B65G 13/075 188/161 |
| 3,756,356 A | * | 9/1973 | Loyd, Jr. | F16D 55/00 188/164 |
| 3,822,390 A | * | 7/1974 | Janson | B65H 59/04 310/104 |
| 4,567,963 A | * | 2/1986 | Sugimoto | A62B 1/08 182/231 |
| 5,054,587 A | | 10/1991 | Matsui et al. | |
| 5,534,108 A | * | 7/1996 | Qian | H01J 37/32623 156/345.28 |
| 5,740,666 A | * | 4/1998 | Yamaguchi | D01H 7/58 57/100 |
| 8,272,476 B2 | * | 9/2012 | Hartman | A62B 1/08 182/11 |

(Continued)

FOREIGN PATENT DOCUMENTS

WO  WO-2006044624 A2 *  4/2006 ............ B60K 25/00

*Primary Examiner* — Katherine W Mitchell
*Assistant Examiner* — Shiref M Mekhaeil
(74) *Attorney, Agent, or Firm* — Ulmer & Berne

(57) ABSTRACT

Embodiments include a system for controlled release of a descent line that can include a shaft secured to a first end of a descent line. Embodiments can include a magnet cradle housing fixedly coupled with the shaft, a first magnet retained by the magnet cradle housing, a coil assembly secured in magnetic proximity to the magnet assembly to generate an electric current by magnetic interaction with the magnet when the shaft is rotated. Embodiments can include a braking assembly powered by the magnet and coil assembly such that the decent of a user is slowed to a safe rate of speed.

8 Claims, 9 Drawing Sheets

(56) References Cited

U.S. PATENT DOCUMENTS

| | | | |
|---|---|---|---|
| 8,490,751 B2 | 7/2013 | Allington et al. | |
| 8,511,434 B2 | 8/2013 | Blomberg | |
| 8,556,234 B2 | 10/2013 | Hartman et al. | |
| 8,739,854 B2 * | 6/2014 | Mullet | E06B 9/60 160/190 |
| 8,851,235 B2 | 10/2014 | Allington et al. | |
| 9,016,432 B2 | 4/2015 | Hartman et al. | |
| 9,016,435 B2 | 4/2015 | Allington et al. | |
| 9,725,948 B2 * | 8/2017 | Mullet | H02P 3/08 |
| 2003/0094337 A1 * | 5/2003 | Richeson | F16D 51/48 188/161 |
| 2008/0016977 A1 * | 1/2008 | Hsieh | E05F 1/006 74/473.16 |
| 2009/0211846 A1 * | 8/2009 | Taylor | A63B 9/0048 182/231 |
| 2010/0065373 A1 * | 3/2010 | Stone | A62B 1/10 182/233 |
| 2010/0308149 A1 * | 12/2010 | Allington | A62B 1/08 242/379 |
| 2012/0261502 A1 | 10/2012 | Thogersen et al. | |
| 2013/0015026 A1 * | 1/2013 | Li | H02K 49/043 188/267 |
| 2013/0186721 A1 * | 7/2013 | Bogdanowicz | H02K 49/043 188/267 |
| 2013/0192934 A1 * | 8/2013 | Knop | F16D 55/28 188/72.3 |
| 2014/0375158 A1 | 12/2014 | Allington et al. | |
| 2015/0136541 A1 * | 5/2015 | Han | F16D 57/002 188/161 |
| 2015/0196820 A1 | 7/2015 | Allington et al. | |
| 2016/0218585 A1 * | 7/2016 | Tzeng | F16C 32/0497 |
| 2017/0333735 A1 * | 11/2017 | Krupp | A62B 1/08 |
| 2018/0045255 A1 * | 2/2018 | Chelaidite | F16D 63/004 |

* cited by examiner

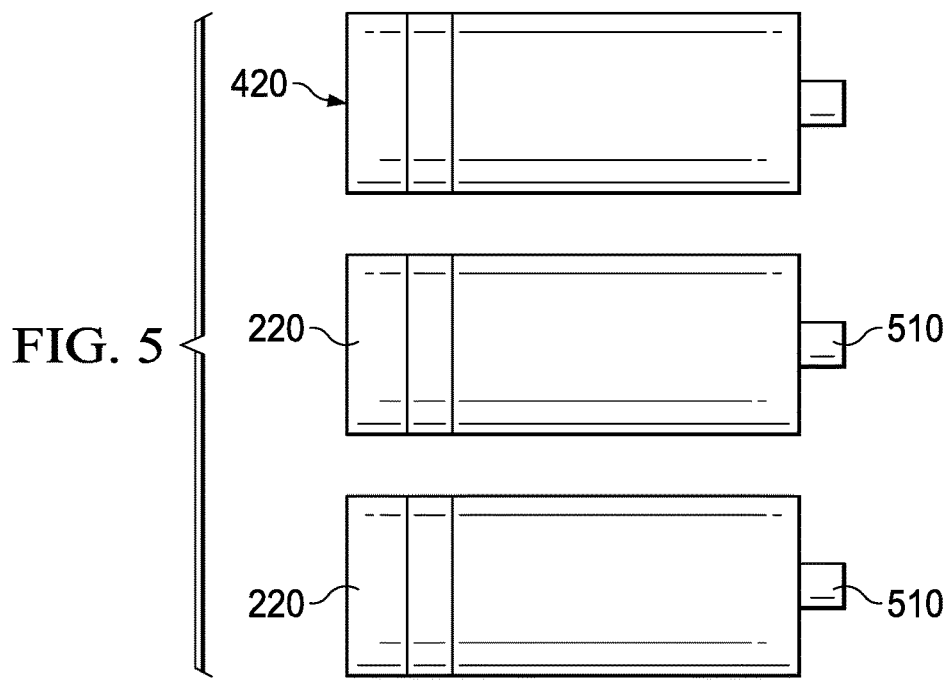
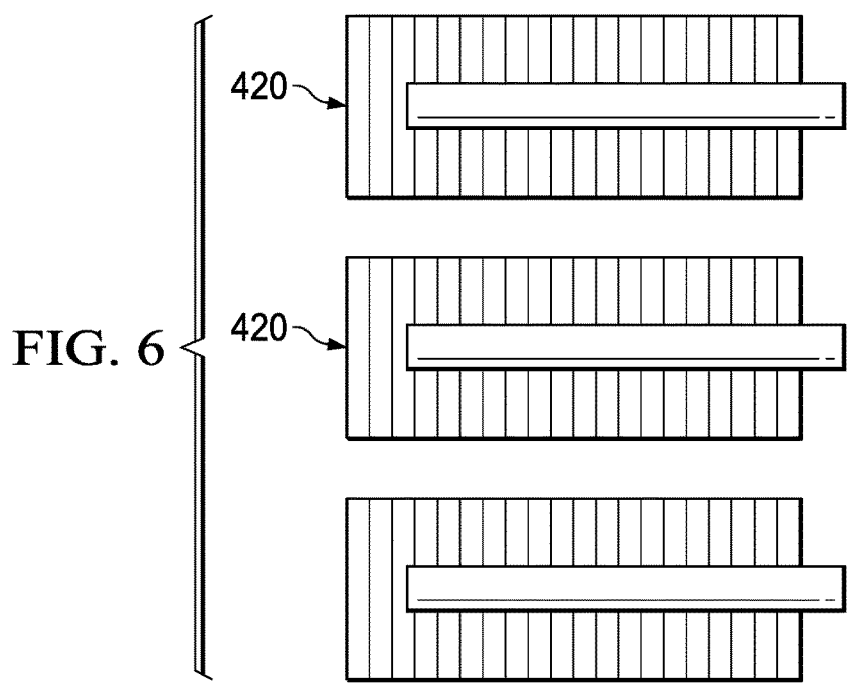

CONTROLLED DESCENT SAFETY SYSTEMS AND METHODS

REFERENCE TO RELATED APPLICATION

The present application claims priority to U.S. provisional patent application Ser. No. 62/191,665, filed Jul. 13, 2016, and hereby incorporates the same application herein by reference in its entirety.

TECHNICAL FIELD

Embodiments of the technology relate, in general, to controlled decent devices, and in particular to personal decent control devices.

BACKGROUND

There arise situations when escape from an elevated position becomes necessary, such as by exiting a window in an upper floor of a building. An emergency situation, such as during a fire, may result in extreme danger to individuals. Use of a standard descent rope to escape from an elevated position is very dangerous, particularly to those not versed in rappelling techniques, where providing an improved safety device would be advantageous.

BRIEF DESCRIPTION OF THE DRAWINGS

FIG. 5 is a right side view of a plurality of coil units according to one embodiment.

FIG. 6 is right side cross-sectional view of the coil units shown in FIG. 5.

DETAILED DESCRIPTION

Figure 1:
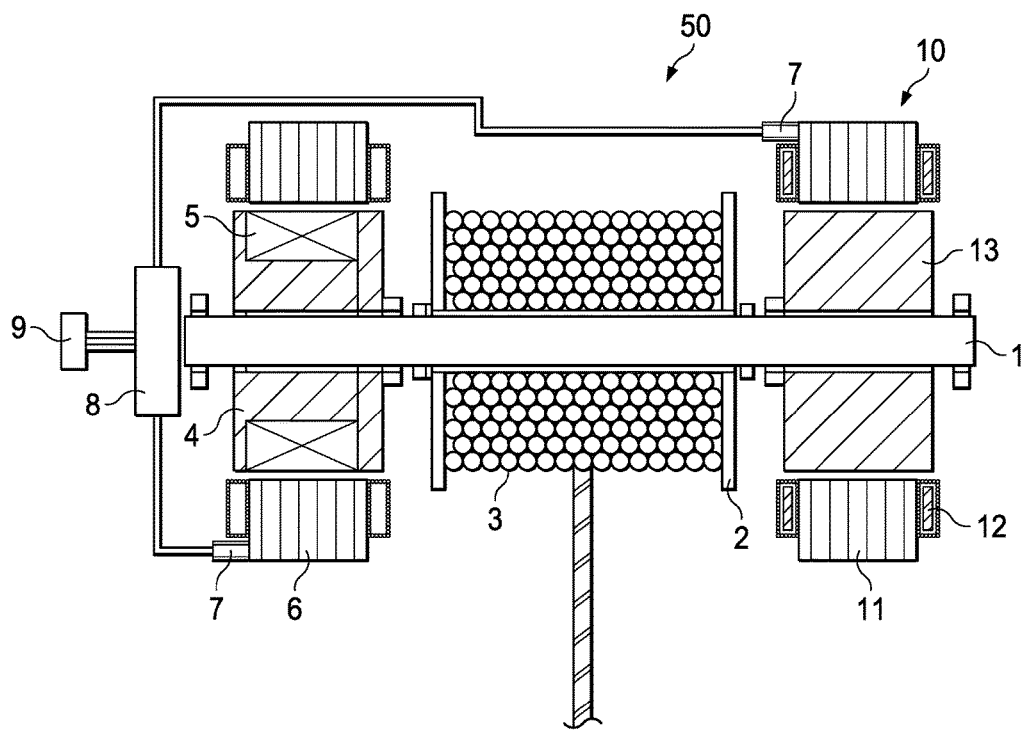
FIG. 1 is a cross-sectional view of a decent control device according to one embodiment.

Certain embodiments are hereinafter described in detail in connection with the views and examples of FIGS. 1-12, wherein like numbers refer to like elements throughout the views.

Various non-limiting embodiments of the present disclosure will now be described to provide an overall understanding of the principles of the structure, function, and use of the apparatuses, systems, methods, and processes disclosed herein. One or more examples of these non-limiting embodiments are illustrated in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures or characteristics may be combined in any suitable manner in one or more embodiments.

The examples discussed herein are examples only and are provided to assist in the explanation of the apparatuses, devices, systems and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. Any failure to specifically describe a combination or sub-combination of components should not be understood as an indication that any combination or sub-combination is not possible. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Controlled descent from emergency situations may be accomplished by a skilled practitioner, such as a firefighter, trained in rappelling. To an untrained, young or infirm individual, the prospect of exiting an emergency situation with a mere rope can be extremely dangerous. Additionally, even trained responders, such as firefighters, may find themselves in situations where they are injured, carrying additional weight such as while rescuing others, or lack the equipment necessary for a controlled descent.

Embodiments described herein can be less expensive, have less mass, be less bulky, and can be easier to maintain than powered winches or other existing safety systems. Embodiments described herein may be useful in power outages, such as those frequently occurring during fires or disasters, where an external power source may not be required. Embodiments described herein can be operated automatically, without hand braking, in a compact and cost effective manner. Embodiments of the system can be used for a variety of different weights of users without the need to adjust for different weights. For example, any firefighter within a normal weight range could attach a device described herein and use the device to safely descend a building without having to input their weight or otherwise tailor the system.

In accordance with an example embodiment, multiple technologies can be incorporated into a single descent control unit that can be suitably fabricated as a portable system. The system, in one embodiment, can allow a user to simply clip into an anchor and jump to a position of safety while descending at a predetermined rate irrespective of weight. As will be further detailed below, an example embodiment can include electrical braking, rather than frictional braking which may be prone to failure and which has a descent rate that can be substantially affected by weight.

In an example embodiment, a descent control device can include an electrical generator powered by the weight being lowered. A descent control system can include an electro-mechanical braking component that can operate in conjunction with a line spooler component and a roller mechanism to retard a rate of egress of a line. Electrical power can be generated by a rotating shaft that can be associated with one or a plurality of magnets as will be detailed further below. In one embodiment, gearing, such as a planetary gear, can be provided between the shaft and a magnetic generator system so as substantially increase a rotation rate of associated magnets relative to that of the rotating shaft. Increasing the rotational velocity can result in enhanced power generation for controlled braking.

Referring to FIG. 1, disclosed is one embodiment of a controlled decent device 50 having a shaft 1, a spool 2, and an attached line 3. In one embodiment, the line 3 can rotate a magnet cradle housing 4 and steel, ferrous, and/or magnets 5. The magnet cradle housing 4 can house one or a plurality of magnets 5 that can spin within a copper winding 6, which can send generated electrical current to a resistor 8 through a terminal 7. A switch 9 can be attached to resistor 8 that can control the amount of electrical current sent to electromagnet 10, which can include copper winding 11 wrapped around a steel or ferrous core 12. A steel, ferrous, or magnet body 13 can spin within electromagnets 10 at a rate that can be determined by both the resistor 8 and the switch 9 such that the electric current supplied to the electromagnet 10 is regulated. Varying the electric current supplied to electromagnet 10 can regulate the speed at which line 3 can payoff from spool 2.

Figure 2:
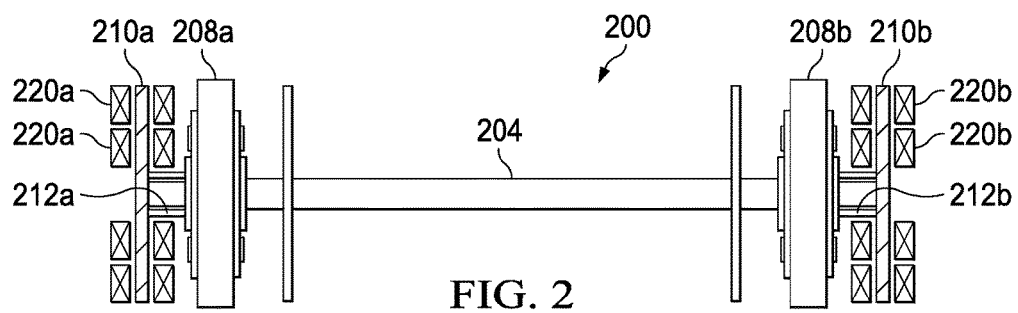
FIG. 2 is a side view of a rotational shaft assembly according to one embodiment.

Turning now to FIG. 2, illustrated is an example embodiment of a rotatable shaft assembly 200. The rotatable shaft assembly 200 can include a shaft 204 that can function as a spool for rope or line. On one or both ends of shaft 204 can be disposed a gearing system 208, illustrated in one embodiment as first and second planetary gear assemblies 208*a* and 208*b*. One or a plurality of gearing systems can function to substantially increase RPMs of a non-ferrous disk, such as non-ferrous metal disks 210*a* and 210*b*, which can suitably mount on distal ends of rapidly rotating shaft portions 212*a* and 212*b*. Secured on non-ferrous disks 210*a* and 210*b* can be a series of magnets 220*a* and 220*b* (collectively magnets 220). Thus, it will be appreciated that as a weight affixed to a rope or line plays out from spool shaft 204, magnets 220*a* and 220*b* can rotate rapidly around the axis of the shaft 204 on shaft portions 212*a* and 212*b*, respectively.

Figure 3A:
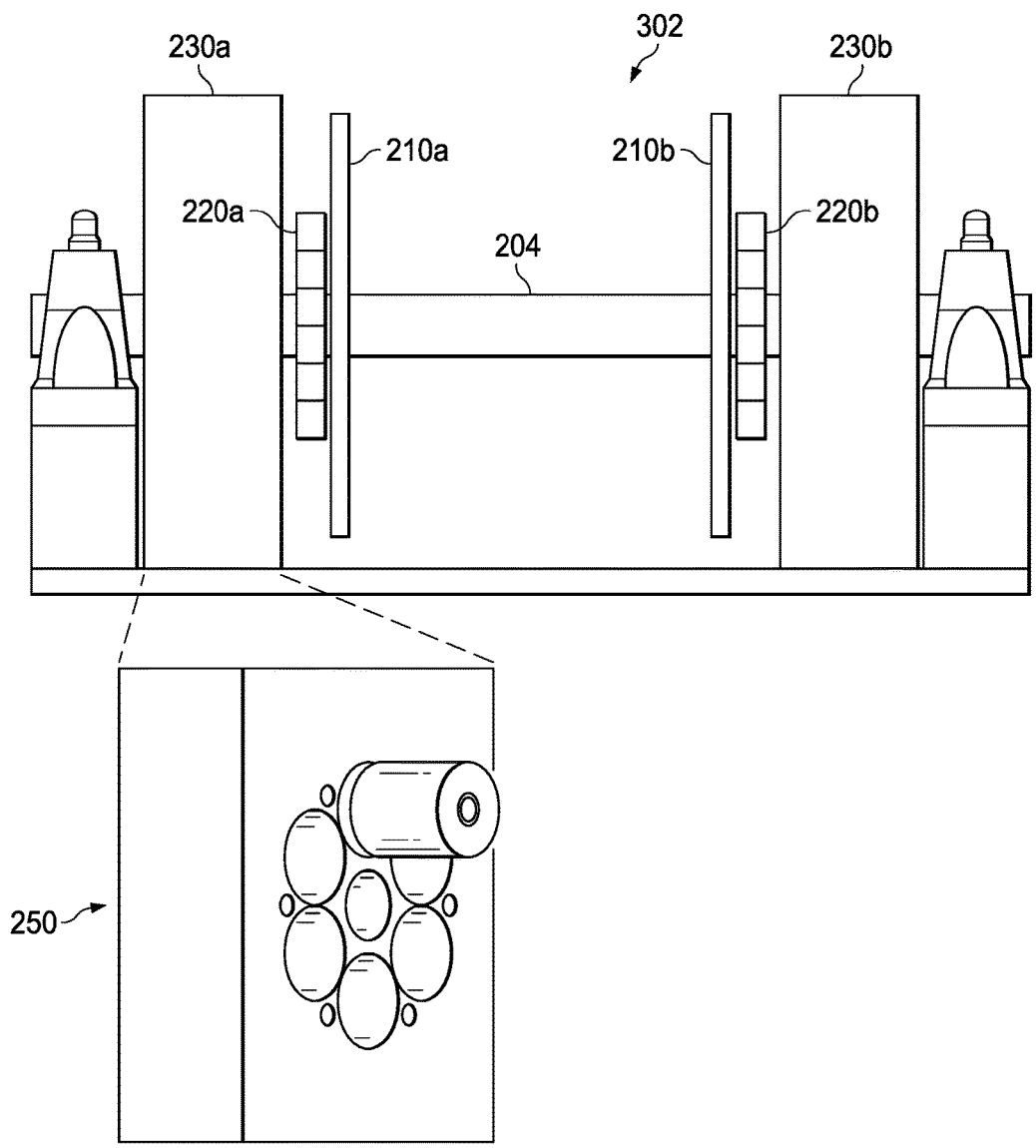
FIG. 3A is a side view of a decent control device according to an alternate embodiment.
Figure 3B:
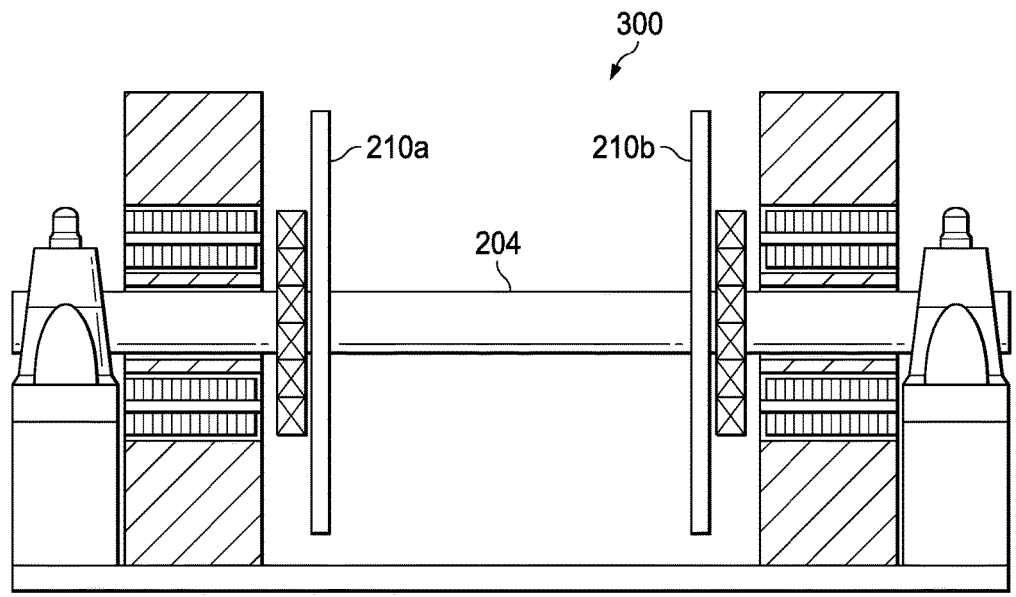
FIG. 3B is a side cross-sectional view of the decent control device shown in FIG. 3A.

Turning now to FIG. 3, illustrated is an example embodiment of internal components and external components of a descent control device. Reference numerals associated with the teachings with FIG. 2 are replicated for ease of understanding. Also illustrated are two stationary coil housing units 230*a* and 230*b*, suitably comprised of an array of coil units in a coil assembly 250. As will be described in greater detail below, the array of coil units can be disposed proximate to rotating magnets 220*a* and 220*b* to magnetically interact to generate power and/or eddy currents to facilitate braking.

Figure 4:
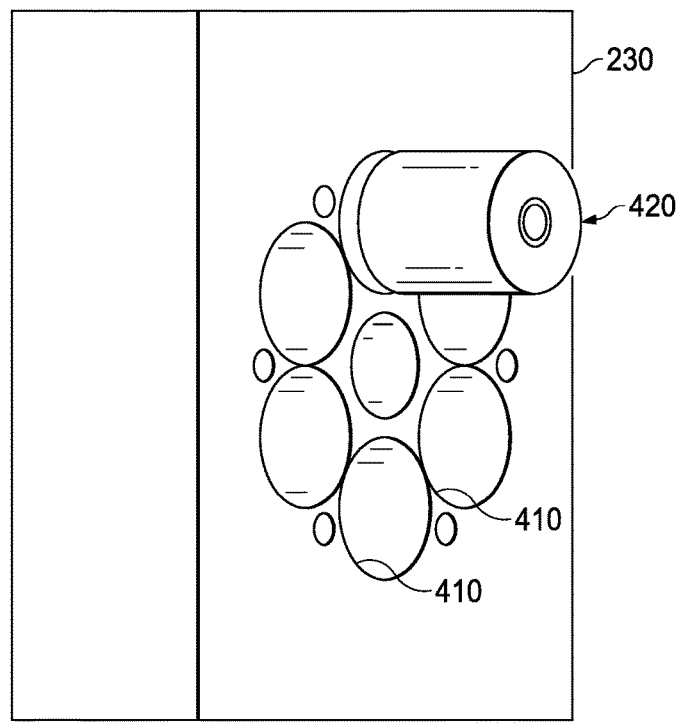
FIG. 4 is a perspective view of a coil housing unit according to one embodiment.

Turning now to FIG. 4, illustrated is an example embodiment of a coil housing unit 230. Analogous parts to the coil assembly 250 are also provided in unshaded drawing 230', the components of which are illustrated analogously. Included are a series of apertures 410, which can be arranged radially around a center line l. Disposed within the apertures can be coil units 420.

Turning now to FIGS. 5 and 6, disclosed is an example embodiment of coil units 420 that can be oriented in a radial pattern so as to coincide with support via coil housing unit 230 and apertures 410, as detailed above. As with the above, FIG. 5 illustrates the coil units 420 in shading and FIG. 6 illustrates the coil units 420 without shading. The illustrated coil units 420 can be positioned in relative proximity to magnets 220, rotating as described above. Each coil unit 420 can include a cylindrical winding of copper or any other suitable conductor that can be wound around a ferrous metal core 510. Movement of the magnets 220 relative to the coil units 420 can provide for generation of electric current in the coil units 420. Additionally, induced eddy currents from the magnets 220 can also place a drag on the rotating shaft 204 via the associated gearing system 208.

Figure 7:
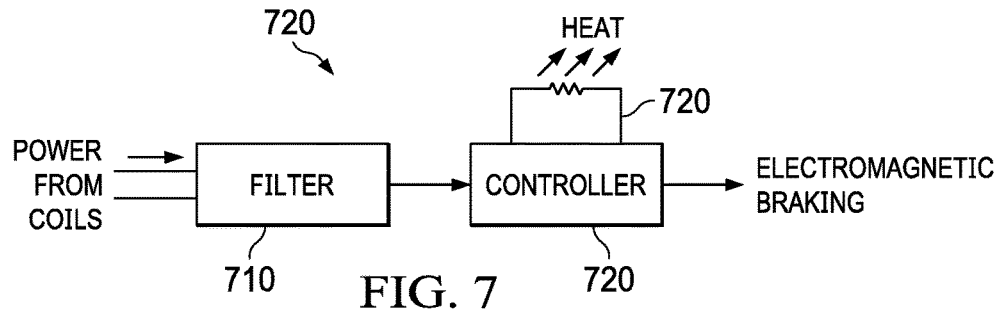
FIG. 7 is a schematic illustrating one system of operation for a controlled decent device.

Turning now to FIG. 7, illustrated is an example embodiment of an electrical control system 700 that can control a speed of a dropping body via an unwinding spool. Power generated by the coil assemblies can be communicated to a filter 710 which can include a rectifier, voltage stabilization, current stabilization, or the like. Power from the filter 710 can be routed to a controller module 720 that can be configured to dissipate power or otherwise control braking or slowing of an unspooling operation. Energy from generated power can be dissipated via a resistance 730. Power can be provided to an electromagnetic braking system that can be associated with the rotating shaft.

Figure 8:
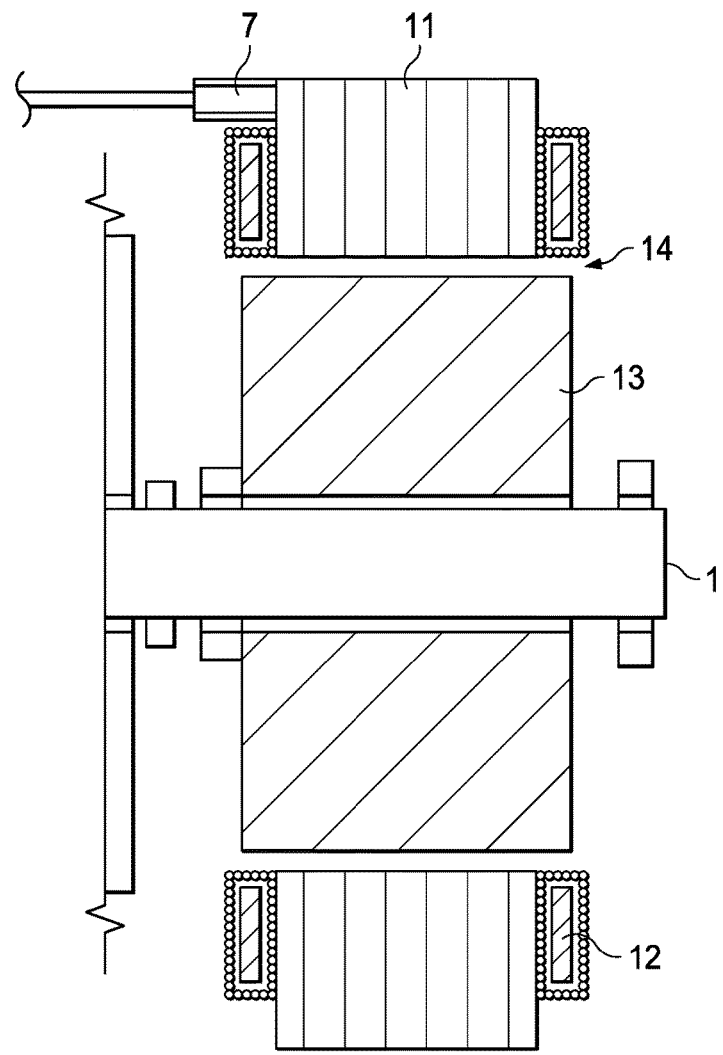
FIG. 8 is a partial view of the cross-section shown in FIG. 1 illustrating a braking assembly according to one embodiment.
Figure 9:
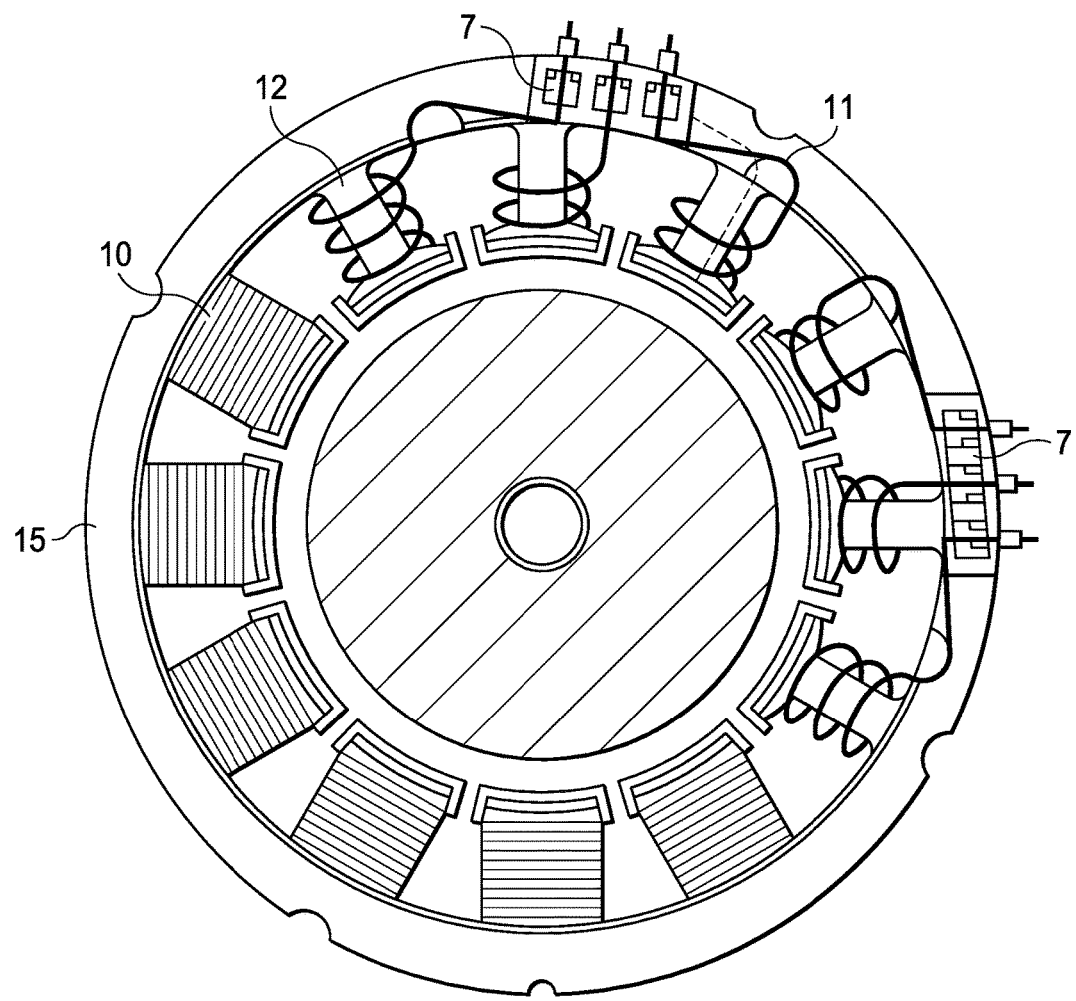
FIG. 9 is a partial cutaway top view of the braking assembly shown in FIG. 8 according to one embodiment.

Referring to FIG. 8, a more detailed view of the controlled decent device 50 shown in FIG. 1 is illustrated according to one embodiment. The shaft 1 can be coupled with the steel, ferrous, or magnet body 13 referenced in FIG. 1. As described, the electricity generated from the magnet 5 and copper winding 6 can be supplied to the copper winding 11. The copper winding 11 can be wrapped around the steel or ferrous core 12 through terminal 7 to function substantially as a braking mechanism. The steel, ferrous, or magnet body 13 can spin within this braking mechanism within any suitable air gap 14. With reference to FIG. 9, together the copper winding 11 wrapped around the steel or ferrous core 12 can create the electromagnet 10. The steel, ferrous, or magnet body 13 can spin within this braking mechanism contained in housing 15.

Figure 10:
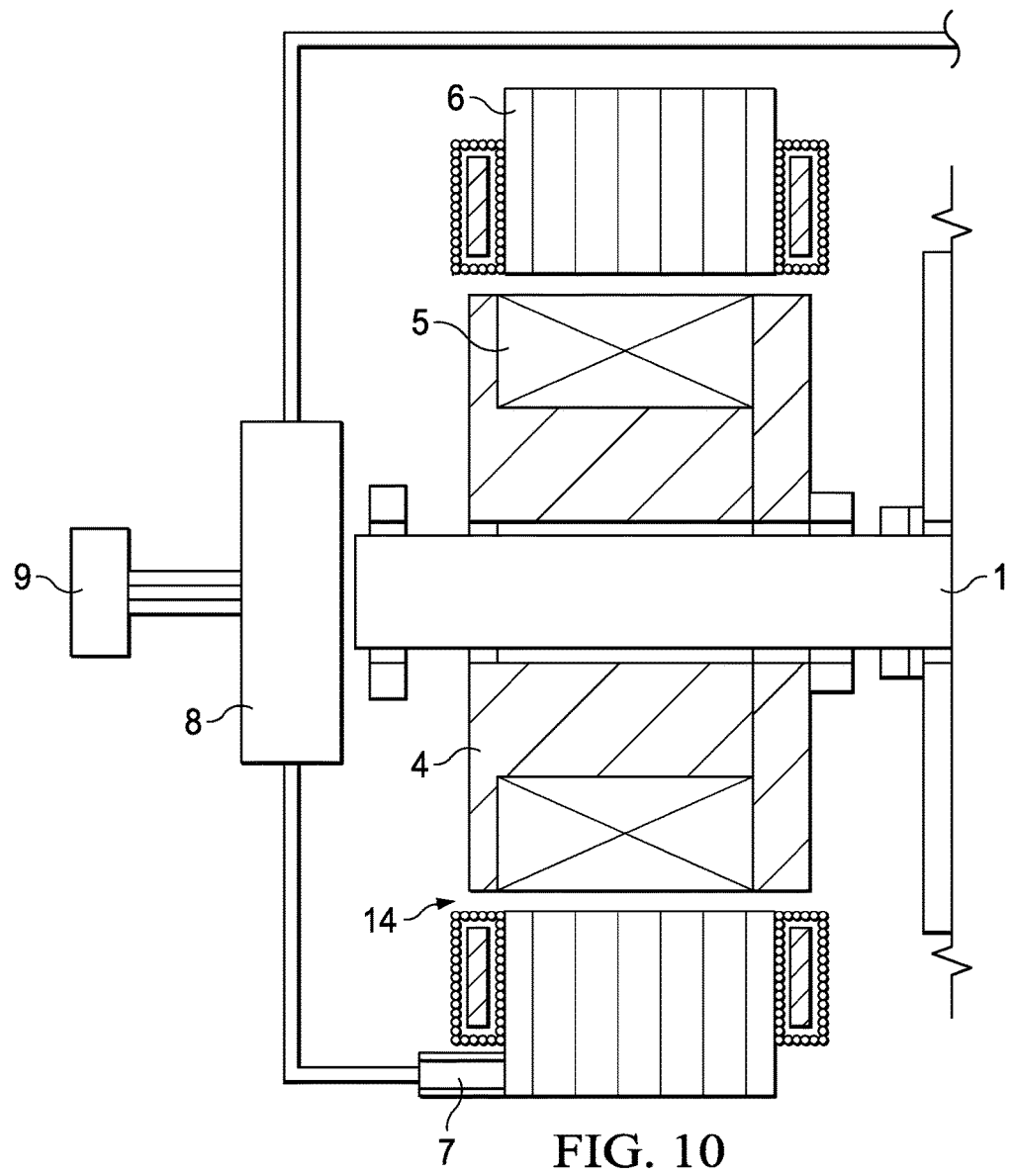
FIG. 10 is a partial view of the cross-section shown in FIG. 1 illustrating a magnet and coil assembly to generate electrical current according to one embodiment.

Referring to FIG. 10, the controlled decent device 50 can include the magnet cradle housing 4 and steel, ferrous, or magnets 5 that can be attached to the shaft 1. The shaft 1 can spin within the copper winding 6 within a specified air gap 14 sending generated electrical current to resistor 8 through terminal 7. Switch 9 can be attached to resistor 8 to control the amount of electrical current sent to electromagnet 10.

Figure 11:
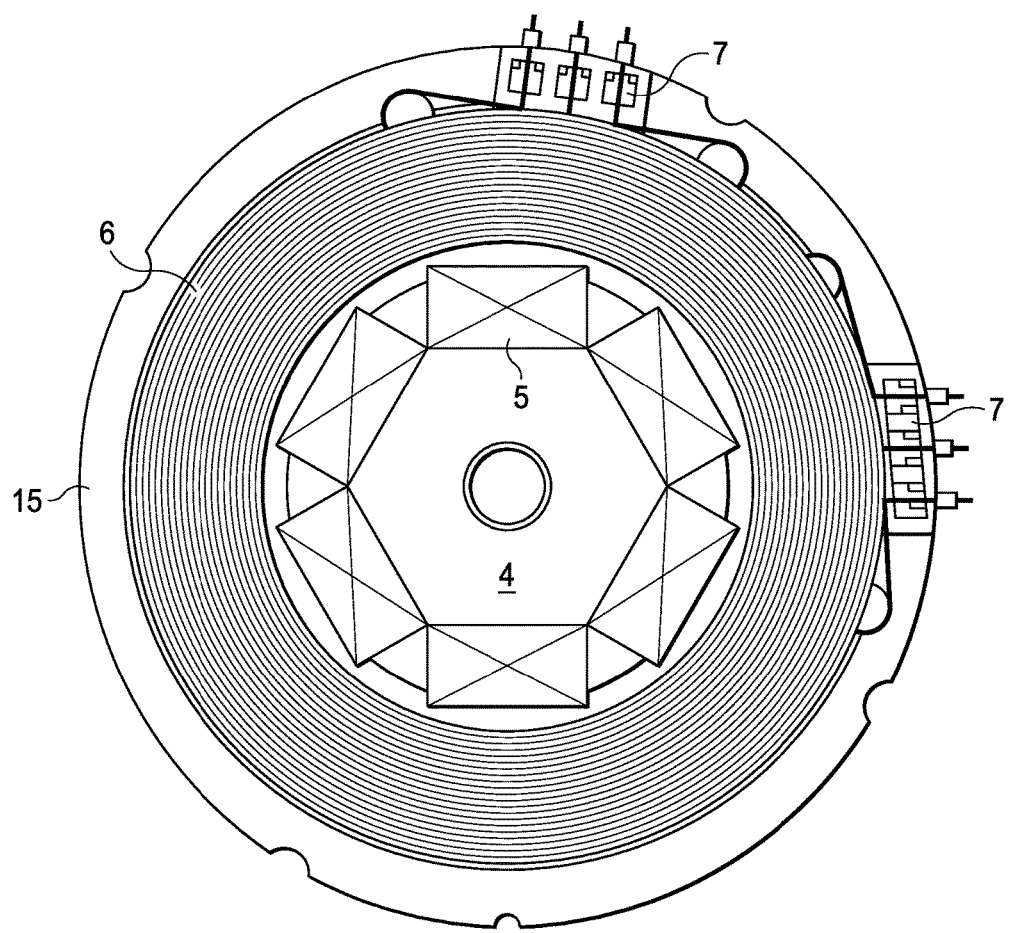
FIG. 11 is a top view of the magnet and coil assembly shown in FIG. 10.
Figure 12:
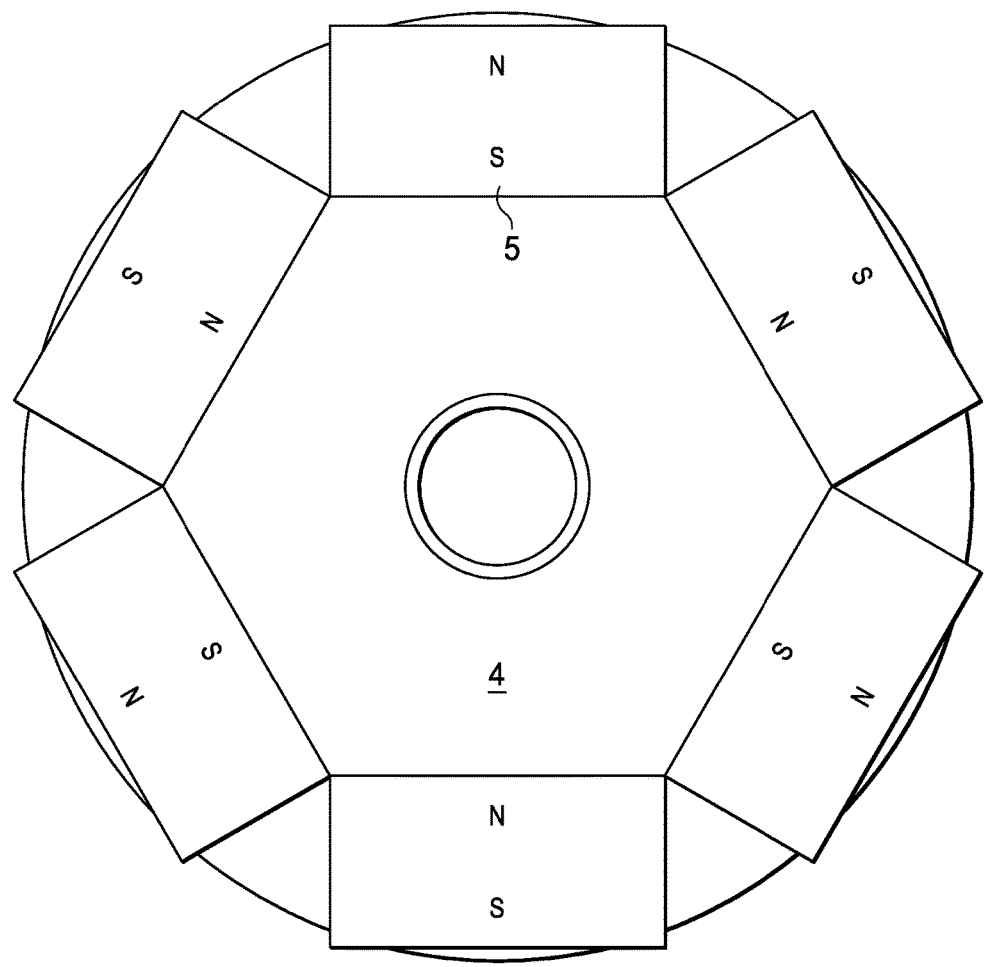
FIG. 12 is a top view of a magnet assembly according to one embodiment.

Referring to FIG. 11, the magnet cradle housing 4 can retain one or more magnets 5 that can spin within the copper winding 6 that can be contained in housing 15. This rotation can generate electricity that can be sent to the brake mechanism through terminal 7. It will be appreciated that the magnet body 13 can be any suitable shape including a continuous solid or a segmented steel, ferrous, or magnet component. Referring to FIG. 12, the magnets 5 can be arranged in a number of different ways based upon polarity or other suitable considerations. Resistor 8 can include a single resistor or an array of resistors. The controlled decent device 50 can utilize capacitors (not shown) that can boost energy to electromagnets before energy production begins due to falling and initiating the device.

In general, it will be apparent to one of ordinary skill in the art that at least some of the embodiments described herein can be implemented in many different embodiments of software, firmware, and/or hardware. The software and firmware code can be executed by a controller, processor or any other similar computing device. The software code or specialized control hardware that can be used to implement embodiments is not limiting. For example, embodiments described herein can be implemented in computer software using any suitable computer software language type, using, for example, conventional or object-oriented techniques. Such software can be stored on any type of suitable computer-readable medium or media, such as, for example, a magnetic or optical storage medium. The operation and behavior of the embodiments can be described without specific reference to specific software code or specialized hardware components. The absence of such specific references is feasible, because it is clearly understood that artisans of ordinary skill would be able to design software and control hardware to implement the embodiments based on the present description with no more than reasonable effort and without undue experimentation.

Moreover, the processes described herein can be executed by programmable equipment, such as computers, controllers, or computer systems and/or processors. Software that can cause programmable equipment to execute processes can be stored in any storage device, such as, for example, a computer system (nonvolatile) memory, an optical disk, magnetic tape, or magnetic disk. Furthermore, at least some of the processes can be programmed when the computer system is manufactured or stored on various types of computer-readable media.

It can also be appreciated that certain portions of the processes described herein can be performed using instructions stored on a computer-readable medium or media that direct a computer system to perform the process steps. A computer-readable medium can include, for example, memory devices such as diskettes, compact discs (CDs), digital versatile discs (DVDs), optical disk drives, or hard disk drives. A computer-readable medium can also include memory storage that is physical, virtual, permanent, temporary, semi-permanent, and/or semi-temporary.

A "controller", "computer," "computer system," "host," "server," or "processor" can be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Any suitable wired, wireless, or datalink for communication is contemplated. Computer systems and computer-based devices disclosed herein can include memory for storing certain software modules used in obtaining, processing, and communicating information. It can be appreciated that such memory can be internal or external with respect to operation of the disclosed embodiments. The memory can also include any means for storing software, including a hard disk, an optical disk, floppy disk, ROM (read only memory), RAM (random access memory), PROM (programmable ROM), EEPROM (electrically erasable PROM) and/or other computer-readable media. Non-transitory computer-readable media, as used herein, comprises all computer-readable media except for a transitory, propagating signal.

In various embodiments disclosed herein, a single component can be replaced by multiple components and multiple components can be replaced by a single component to perform a given function or functions. Except where such substitution would not be operative, such substitution is within the intended scope of the embodiments. The computer systems can comprise one or more processors in communication with memory (e.g., RAM or ROM) via one or more data buses. The data buses can carry electrical signals between the processor(s) and the memory. The processor and the memory can comprise electrical circuits that conduct electrical current. Charge states of various components of the circuits, such as solid state transistors of the processor(s) and/or memory circuit(s), can change during operation of the circuits.

Some of the figures can include a flow diagram. Although such figures can include a particular logic flow, it can be appreciated that the logic flow merely provides an exemplary implementation of the general functionality. Further, the logic flow does not necessarily have to be executed in the order presented unless otherwise indicated. In addition, the logic flow can be implemented by a hardware element, a software element executed by a computer, a firmware element embedded in hardware, or any combination thereof.

The foregoing description of embodiments and examples has been presented for purposes of illustration and description. It is not intended to be exhaustive or limiting to the forms described. Numerous modifications are possible in light of the above teachings. Some of those modifications have been discussed, and others will be understood by those skilled in the art. The embodiments were chosen and described in order to best illustrate principles of various embodiments as are suited to particular uses contemplated. The scope is, of course, not limited to the examples set forth herein, but can be employed in any number of applications and equivalent devices by those of ordinary skill in the art. Rather it is hereby intended the scope of the invention to be defined by the claims appended hereto.

What is claimed is:

1. A system for controlled release of a descent line, the system comprising:
   a housing;
   a shaft at least partially retained within the housing and having a central axis, the shaft being secured to a first end of a descent line, wherein the shaft rotates about the central axis when a force is applied to a second end of the descent line;
   a magnet cradle housing coupled to a first end of the shaft such that the magnet cradle housing rotates together with the shaft;
   at least one magnet retained by the magnet cradle housing, such that the at least one magnet is coupled with the shaft;
   a coil assembly coupled with the housing is magnetic proximity to the at least one magnet, the coil assembly and the at least one magnet cooperating to facilitate generation of electric current when the shaft is rotating;
   a ferrous body coupled to a second end of the shaft;
   an electromagnet coupled with the housing in magnetic proximity to the ferrous body;
   a first terminal electrically coupled with the coil assembly;
   a second terminal electrically coupled with the electromagnet and in electrical communication with the first terminal to facilitate transmission of the electric current generated by the coil assembly to the electromagnet such that the electromagnet cooperates with the ferrous body to facilitate reduction of a rotational speed of the shaft.

2. The system of claim 1, wherein the coil assembly comprises a copper winding.

3. The system of claim 1, further comprising at least one resistor and a switch in electrical communication between the first terminal and the second terminal to regulate the electrical current delivered to the electromagnet.

4. The system of claim 3, wherein the at least one resistor further comprises an array of resistors.

5. The system of claim 1, further comprising a capacitor in electrical communication between the first terminal and the second terminal.

6. The system of claim 1, further comprising a spool coupled with the shaft to retain the descent line.

7. The system of claim 1, wherein the at least one magnet comprises a plurality of magnets.

8. The system of claim 1, wherein the electromagnet comprises a ferrous core and a copper winding wound around the ferrous core.

* * * * *